(12) United States Patent
Lecourtier et al.

(10) Patent No.: US 9,712,395 B2
(45) Date of Patent: Jul. 18, 2017

(54) METHOD FOR THE EXCHANGE OF DATA BETWEEN NODES OF A SERVER CLUSTER, AND SERVER CLUSTER IMPLEMENTING SAID METHOD

(75) Inventors: Georges Lecourtier, Versailles (FR); Alain Spir, Plaisir (FR)

(73) Assignee: BULL SAS, Les Clayes-sous-Bois (FR)

( * ) Notice: Subject to any disclaimer, the term of this patent is extended or adjusted under 35 U.S.C. 154(b) by 403 days.

(21) Appl. No.: 14/241,436

(22) PCT Filed: Aug. 28, 2012

(86) PCT No.: PCT/FR2012/051946
§ 371 (c)(1),
(2), (4) Date: Feb. 26, 2014

(87) PCT Pub. No.: WO2013/030505
PCT Pub. Date: Mar. 7, 2013

(65) Prior Publication Data
US 2014/0204804 A1    Jul. 24, 2014

(30) Foreign Application Priority Data

Aug. 30, 2011  (FR) ...................................... 11 57644

(51) Int. Cl.
*H04L 12/28*  (2006.01)
*H04L 12/24*  (2006.01)
(Continued)

(52) U.S. Cl.
CPC ............. *H04L 41/12* (2013.01); *H04L 43/08* (2013.01); *H04L 43/10* (2013.01); *H04L 45/06* (2013.01);
(Continued)

(58) Field of Classification Search
USPC ......................................................... 370/255
See application file for complete search history.

(56) References Cited

U.S. PATENT DOCUMENTS

| 5,105,424 A | 4/1992 | Flaig et al. |
| 6,445,682 B1 * | 9/2002 | Weitz ................. H04L 12/2856 370/257 |

(Continued)

FOREIGN PATENT DOCUMENTS

DE          4023767 A1    3/1991

OTHER PUBLICATIONS

Pitt et al. "Table Free Bridging", IEEE Journal on Selected Areas in Communications, IEEE Service Center, vol. SAC-05, No. 9 Dec. 1987, pp. 1454-1462.

(Continued)

*Primary Examiner* — Gregory Sefcheck
*Assistant Examiner* — Majid Esmaeilian
(74) *Attorney, Agent, or Firm* — Pillsbury Winthrop Shaw Pittman LLP

(57) ABSTRACT

A method for the exchange of data between nodes of a server cluster comprising a plurality of nodes interconnected together by a geographic interconnection network comprising a plurality of transmission segments linking the nodes together, including sending by a sending node, data intended for at least one other node, or receiving node, transmitting the data using the geographic interconnection network, receiving the data by each receive node, supplying the data to each receiving node with information relating to the transmission segments of the geographic interconnection network traversed between the sending node and this receiving node on the transmission thereof.

13 Claims, 4 Drawing Sheets

Figure 1:
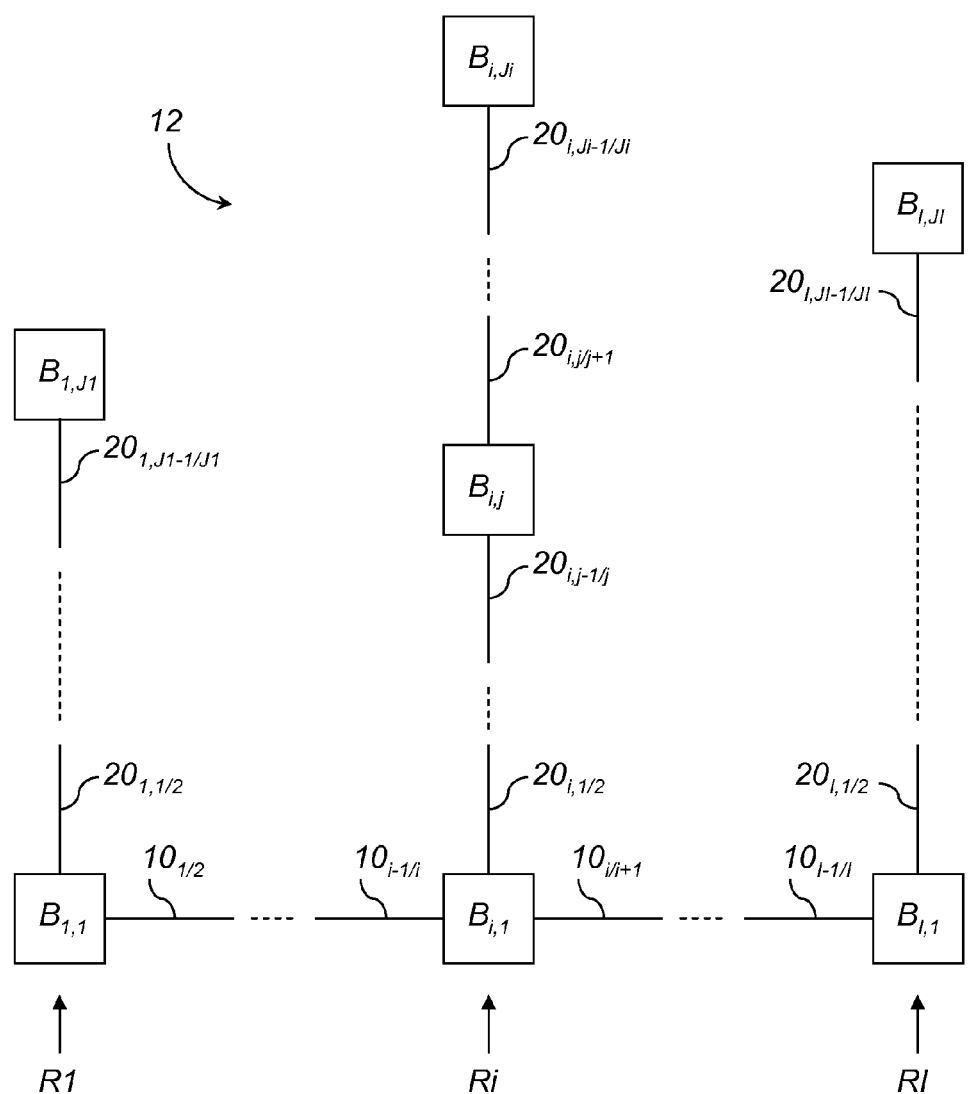

(51) Int. Cl.
*H04L 12/721* (2013.01)
*H04L 12/733* (2013.01)
*H04L 12/26* (2006.01)

(52) U.S. Cl.
CPC .............. *H04L 45/20* (2013.01); *H04L 45/34* (2013.01); *H04L 45/36* (2013.01)

(56) References Cited

U.S. PATENT DOCUMENTS

| | | | | |
|---|---|---|---|---|
| 7,626,926 | B2 * | 12/2009 | Abi-Nassif | H04L 47/10 370/229 |
| 2002/0001302 | A1 * | 1/2002 | Pickett | H04L 12/2856 370/352 |
| 2003/0172178 | A1 * | 9/2003 | Lecha | H04L 12/2854 709/236 |
| 2011/0002334 | A1 * | 1/2011 | Baduge | H04L 12/185 370/390 |
| 2012/0134287 | A1 * | 5/2012 | Turunen | H04W 4/06 370/252 |

OTHER PUBLICATIONS

International Search Report for PCT/FR2012/051946, date of mailing Nov. 12, 2012.

* cited by examiner

METHOD FOR THE EXCHANGE OF DATA BETWEEN NODES OF A SERVER CLUSTER, AND SERVER CLUSTER IMPLEMENTING SAID METHOD

The present invention relates to a method for the exchange of data between nodes of a server cluster and a server cluster implementing said method.

It relates more specifically to a cluster of servers comprising a plurality of nodes interconnected together by a geographic interconnection network comprising a plurality of transmission segments linking the nodes together.

Such a server cluster generally adopts the form of a computing facility comprising a plurality of networked computers, externally viewed as a computer with a very high computing power, or HPC ("High Performance Computing") computer. Such an optimised facility is suitable for distributing complex processes and/or parallel computing on at least a portion of the nodes of the cluster.

All the computers/calculators of the server cluster, the management modules of the chassis wherein they are generally integrated and the management modules of the computers racks wherein these chassis are generally integrated form all the nodes of this cluster, given that the term "node" denotes a computer or a management module suitable for comprising one or a plurality of processing unit(s). A distinction may thus be made between two types of nodes: compute nodes and service nodes. Compute nodes are those actually executing the various complex processing and/or parallel computing instructions: therefore, they exchange compute data with each other. They further exchange service data with the supervising service nodes thereof. The service nodes merely exchange service data with the other nodes of the server cluster.

The nodes of a server cluster are generally all connected to the same first general administration network operating under the IP protocol (notably TCP/IP), via data packet transmission links, e.g. Ethernet, for exchanging service data. For example, among other things, event notification messages such as fault, error reports or other alerts transit via this network. Among these nodes, a general administration server connected to this first network may thus exchange service data with all the other nodes of the server cluster provided that each of these nodes has a unique IP address in this first administration network.

For running complex computing at high speed, the nodes of a server cluster are further generally interconnected together by a second network designed for complex processing and/or parallel computing compute data transmission. This compute data management network, used for running high-speed computing using a plurality of computers prompted in parallel, has high performances in terms of transmission speed enabling data to be transmitted in less than one microsecond from one server cluster node to another. Therefore, this second network serves among other things to exchange compute data between the nodes since it has a markedly higher transmission speed than the first administration network.

The nodes of a server cluster may further be interconnected together by one or a plurality of further networks, notably service data management networks, optionally dedicated to certain tasks and independent of the first and second networks.

At least one of the networks interconnecting the nodes of the server cluster, whether it is the first general administration network, the second compute data management network or any further networks, comprises a plurality of transmission segments each connecting point-to-point two elements of the server clusters such as two rows of computer racks, two computer racks from the same row, two chassis from the same computer rack or two computers from the same chassis. This network is described as a geographic interconnection network in terms of physical mapping of the network nodes, this mapping being directly correlated with the network topology.

Besides the IP address thereof, the nodes of a server cluster are identified uniquely by a MAC (Media Access Control) address allocated thereto by design once they have an IP interface compatible with the first administration network. It is then the purpose of an addressing policy to associate an IP address with the MAC address of each node, when initialising the node in the server cluster.

However, if the IP interface for accessing a node in the first administration network is not available, notably during the initialisation thereof, or if the administration network itself is not available, then the node becomes inaccessible for the transmission of a large number of service data.

Moreover, the IP addressing policy is suitable for providing a logical location of each node in the first administration network, but the actual geographic location of any node in this first administration network, in the second compute data management network or in any further networks is difficult to determine merely on the basis of the MAC address thereof. It requires verification and mapping defined manually by an operator moving from node to node to note the MAC addresses. This is both a source of errors and unstable given that the nodes have a limited lifetime and are intended to be replaced from time to time.

Furthermore, since hardware faults and some software faults in the nodes are generally identifiable on the nodes themselves using control panels, maintenance operations also require operators to move from node to node for local servicing operations.

According to one known data exchange method, "Traceroute" type commands in Unix or Linux are suitable for determining a logical path followed by data by identifying the nodes traversed by the IP addresses thereof, but are not suitable for locating these nodes geographically.

It may thus be sought to provide a method for the exchange of data between nodes of a server cluster which is suitable for doing away with at least some of the aforementioned problems and constraints, notably suitable for obtaining superior knowledge of the nodes than the mere logical location thereof in the IP administration network.

The invention thus relates to a method for the exchange of data between nodes of a server cluster comprising a plurality of nodes interconnected together by a geographic interconnection network comprising a plurality of transmission segments linking the nodes together, the method comprising:
  sending by a node, or send node, data intended for at least one other node, or receive node,
  transmission of this data using the geographic interconnection network,
  reception of the data by the receive node,
characterized in that the data is supplied to the receive node with information relating to the transmission segments of the geographic interconnection network traversed between the send node and the receive node on the transmission thereof.

In this way, the method for the exchange of data is suitable for identifying the path followed by the data between the send node and the receive node in the geographic interconnection network, which consists of identifying the relative geographic location of these two nodes when the interconnection network is geographically clearly structured. This is notably the case of a geographic interconnection network consisting of transmission segments each connecting for example point-to-point two elements of the server clusters such as two rows of computer racks, two computer racks from the same row, two chassis from the same computer rack or two computers from the same chassis.

Optionally, the plurality of transmission segments is organised according to a predetermined limited number of connection directions and the information relating to the transmission segments traversed is expressed in a system of coordinates expressed in these connection directions.

Also optionally, the information relating to the transmission segments traversed comprises at least one counter incremented or decremented once a corresponding transmission segment is traversed by the data on the transmission thereof, notably one counter in each connection direction incremented or decremented once a transmission segment linking two nodes in the corresponding direction is traversed by the data on the transmission thereof.

Also optionally, an increment or decrement value is associated with each transmission segment and defined according to the presence or not of at least one additional node of the server cluster not connected to the geographic interconnection network but arranged geographically between the two nodes interconnected by this transmission segment.

Also optionally, for allocating a geographic address to each node, a method according to the invention may comprise:
- selection of a geographic source chosen from the nodes of the server cluster,
- allocation of a source address to this geographic source, and initialisation of the counter to at least one value defined on the basis of the source address allocated,
- transmission via the geographic source, to all the other nodes of the server cluster, or receive nodes, of a message identified as requiring the allocation of a geographic address and including the counter, this transmission requiring incrementation or decrementation of the counter once the message passes through a corresponding transmission segment,
- allocation, to each receive node, of a geographic address in the server cluster defined on the basis of the value adopted by the counter when the message is received by this receive node,
- saving of the geographic address of each node in address storage means of the server cluster.

Also optionally, the geographic address allocated to any of the nodes of the server cluster is saved locally by this node in storage means comprised therein.

Also optionally, for verifying the integrity of the geographic interconnection network and the geographic addresses allocated, a method according to the invention may comprise:
- initialisation of the counter to at least one value defined on the basis of the geographic address of an administer node responsible for verifying said integrity,
- transmission via this administer node, to all the other nodes of the server cluster, or receive nodes, of a message identified as requiring a verification of said integrity and including the counter, this transmission requiring incrementation or decrementation of the counter once the message passes through a corresponding transmission segment,
- return to the administer node, via at least a portion of the receive nodes, of validation or error messages in response to the request message,
- detection of a possible malfunction of the geographic interconnection network or a possible inconsistency in the allocation of the geographic addresses on the basis of the messages returned to the administer node.

Also optionally:
- on sending, by the send node, data intended for the receive node, the counter is initialised to at least one value defined on the basis of the geographic address of the send node,
- upon the transmission of this data using the geographic interconnection network, the counter is incremented or decremented once a corresponding transmission segment is traversed by a message comprising this data and the data is further transmitted with at least one value corresponding to the geographic address of the receive node,
- the data is considered to have reached the receive node when the counter value is equal to the geographic address value of the receive node transmitted with the data.

Also optionally, the data transmitted by the send node to the receive node comprises one of the elements of the set consisting of:
- a request to allocate a geographic address to the receive node, the send node of this request being a geographic source chosen from the nodes of the server cluster,
- a request to verify the geographic address of the receive node, the send node of this request being a geographic source chosen from the nodes of the server cluster,
- a MAC address request, the send node of this request being an administer node of the MAC addresses of all the nodes of the server cluster,
- a response to a MAC address request,
- a command to emulate a control panel command function of the receive node, notably a restart, operation restore, initialisation or maintenance function, and
- a command to emulate a control panel command function of the receive node, notably a reporting or alarm function.

The invention also relates to a server cluster comprising a plurality of nodes interconnected together by a geographic interconnection network comprising a plurality of transmission segments linking the nodes together, the server cluster comprising transmission means, using the geographic interconnection network, of data sent by a node, or send node, and intended for at least one other node, or receive node, characterized in that it comprises:
- means for generating information relating to the transmission segments of the geographic interconnection network traversed between this send node and this receive node on the transmission thereof, and
- means for supplying, to the receive node, this information with the transmitted data.

Optionally:
- the nodes are further interconnected together by an administration network suitable for service data transmission according to the IP protocol and each comprise a predefined MAC address network interface,
- addressing means are provided for allocating a geographic address to each node of the server cluster on the basis of the information relating to the transmission segments of the geographic interconnection network traversed between a node chosen as the geographic source and each node, and
- saving means are provided for saving and storing the geographic address allocated to each node in association with the MAC address thereof.

Also optionally:
  each node is included in a chassis, in turn included in a computer rack, in turn included in a row of computer racks, the server cluster comprising a plurality of rows of computer racks,
  the geographic interconnection network comprises a plurality of segments for interconnecting the rows together, segments for interconnecting computer racks from the same row together, segments for interconnecting chassis from the same computer rack together and segments for interconnecting nodes from the same chassis together,
the server cluster comprising means for exchanging data between the send node and each receive node designed to transmit, with this data, at least one item of information relating to the number of row interconnection segments traversed between the send node and this receive node, the number of computer rack interconnection segments traversed between the send node and this receive node and the number of chassis interconnection segments traversed between the send node and this receive node.

Also optionally, the information relating to the transmission segments traversed between the send node and each receive node comprising at least one field for indicating the number of row interconnection segments traversed between the send node and this receive node, a field for indicating the number of computer rack interconnection segments traversed between the send node and this receive node and a field for indicating the number of chassis interconnection segments traversed between the send node and this receive node, incrementing or decrementing means are provided for incrementing or decrementing each of these fields once a message including data exchanged between the send node and this receive node passes through a corresponding segment.

Also optionally, a server cluster according to the invention may comprise:
  a first general administration network interconnecting all the nodes together, and
  at least one second management network of compute data intended to be exchanged between the nodes, interconnecting at least a portion of the nodes together,
and said geographic interconnection network may be an additional network, separate from the general administration network and the compute data management network, notably a network using the HDLC protocol.

Figure 2:
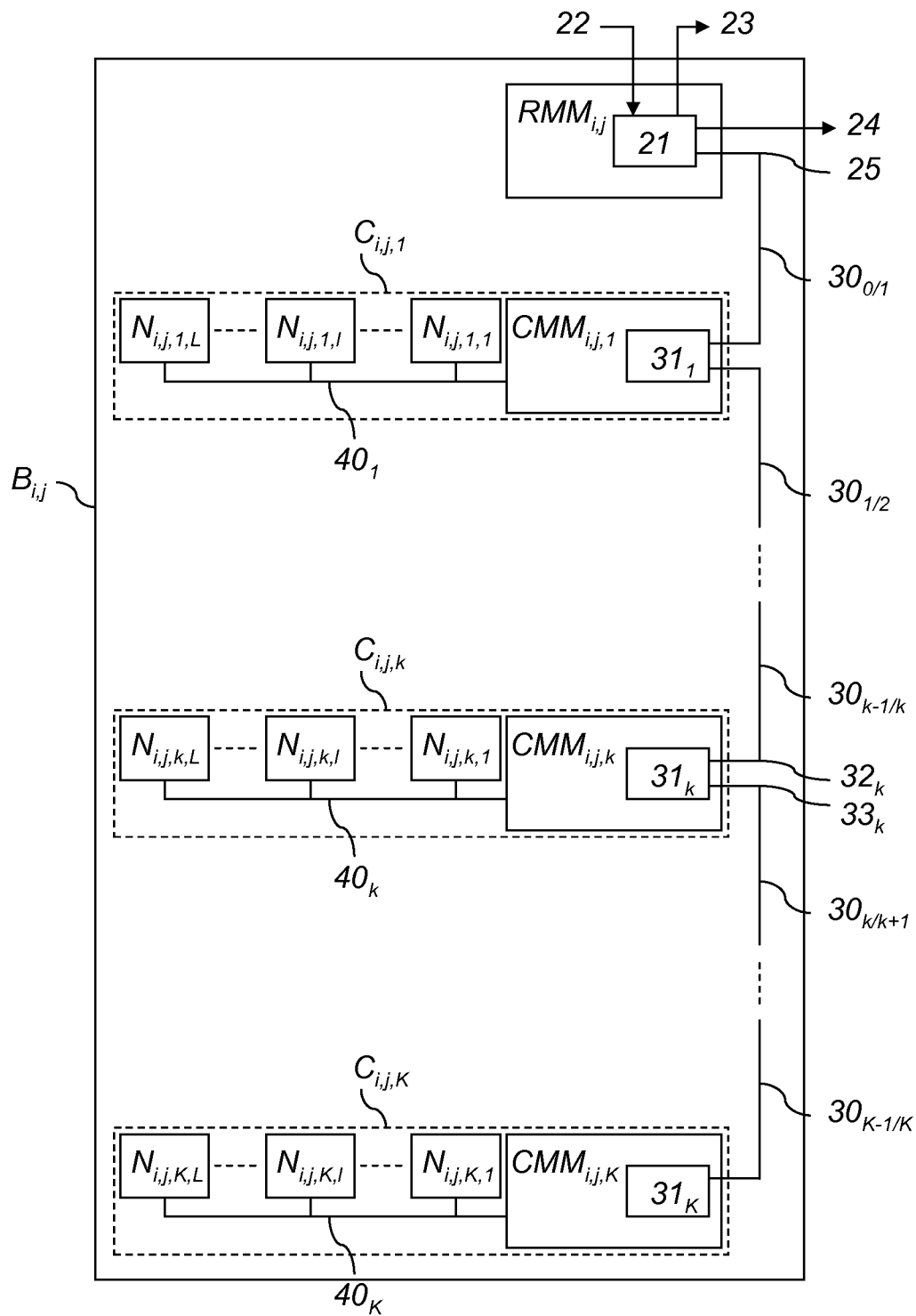
Figure 3:
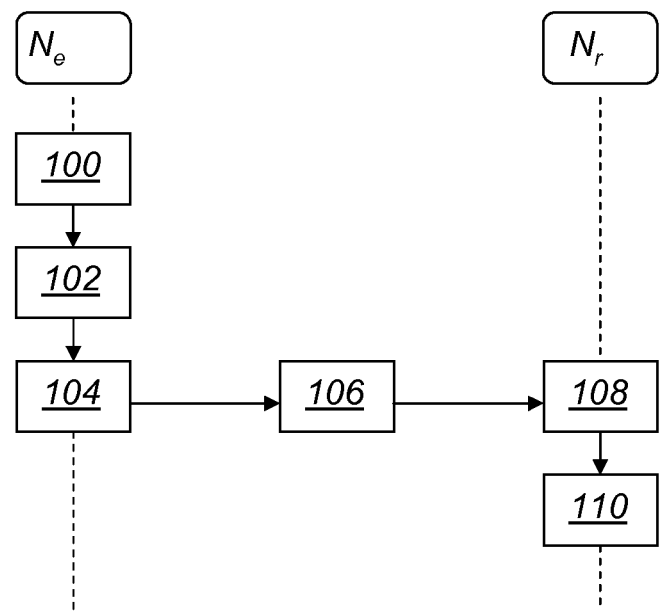
Figure 4:
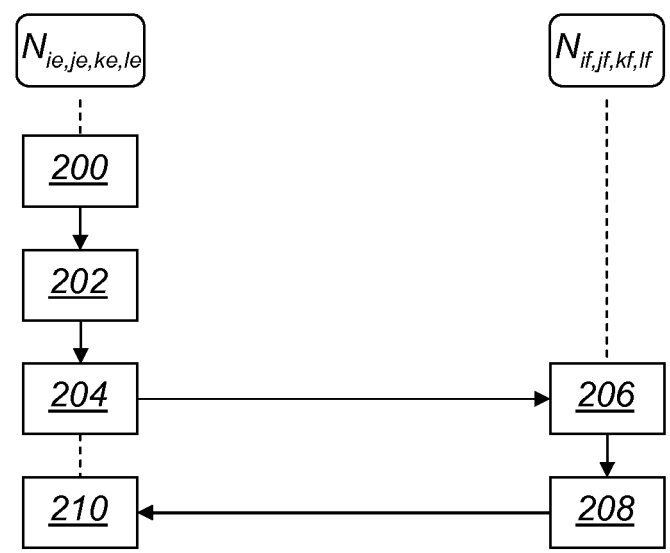
Figure 5:
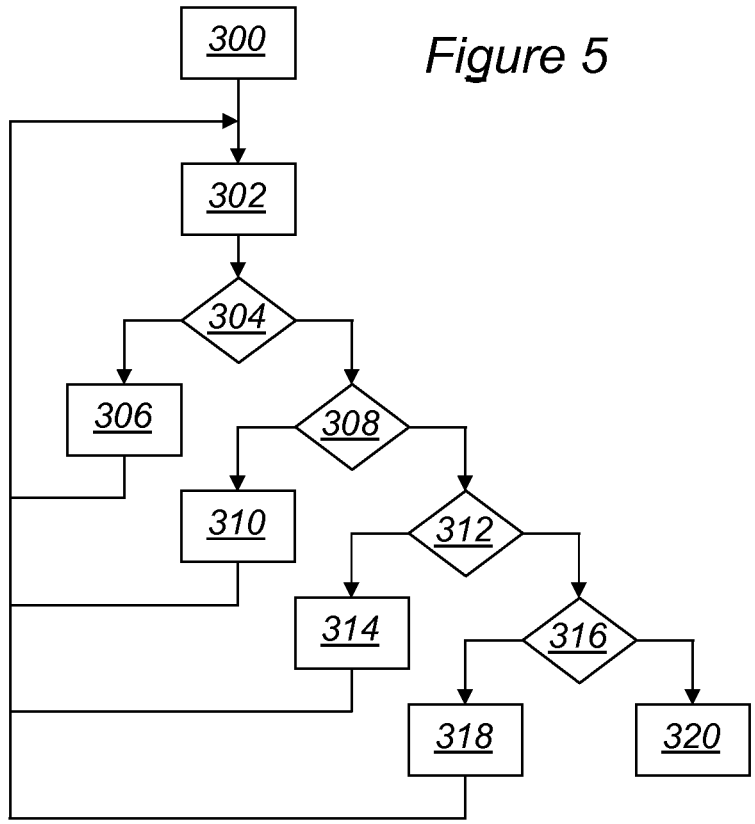
Figure 6:
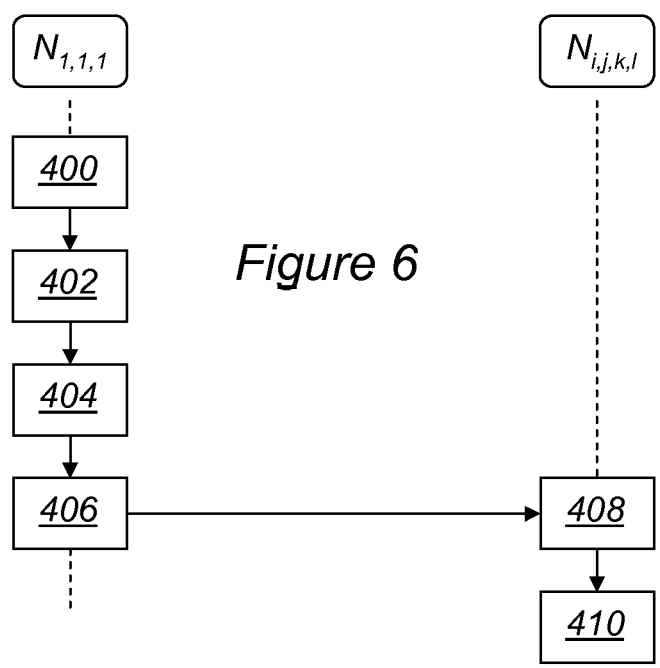

The invention will be understood more clearly using the following description, given merely as an example and with reference to the appended drawings wherein:

FIG. 1 represents schematically the general structure of a server cluster according to one embodiment of the invention, FIG. 2 details schematically the general structure of a computer rack of the server cluster in FIG. 1, FIG. 3 illustrates the successive steps of a method for the exchange of data used in the server cluster in FIG. 1, FIGS. 4 and 6 illustrate possible applications and alternative embodiments of the method in FIG. 3, and FIG. 5 illustrates the successive steps of a method for navigating the server cluster in FIG. 1 for a looped implementation of the method in FIG. 4.

The server cluster 12 illustrated in FIG. 1 comprises a plurality of computer racks annotated $B_{i,j}$ according to the position thereof. This server cluster is for example organised into a plurality of rows R1, . . . , Ri, . . . RI, each of these rows comprising at least one computer rack. It should be noted that the number of computer racks per row is not necessarily identical from one row to another. In this way, in the example illustrated in FIG. 1, the first row of computer racks R1 comprises J1 computer racks annotated $B_{1,1}, \ldots, B_{1,J1}$, the i-th row Ri comprises Ji computer racks annotated $B_{i,1}, \ldots, B_{i,Ji}$ and the final row of racks RI comprises JI computer racks annotated $B_{I,1}, \ldots, B_{I,JI}$. In particular, the j-th computer rack of the i-th row Ri is annotated $B_{i,j}$.

As also detailed with reference to FIG. 2, and in a simplified view of the server cluster 12 where each computer rack is operational and equipped with computing means, each computer rack in turn comprises at least one chassis, each chassis of each computer rack in turn comprising at least one computer, i.e. a compute node. Such a computer is, as mentioned above, a node of the server cluster 12 and comprises one or a plurality of processing unit(s). According to this conventional architecture, each node of the server cluster 12 is thus included in a chassis, in turn included in a computer rack, in turn included in one of the rows R1, . . . , Ri, . . . RI.

The server cluster 12 is intended to be connected to a backbone network (not shown) and is thus externally viewed, i.e. from the perspective of a control terminal also connected to the backbone network, as a single HPC computer entity.

Some of the nodes of the server cluster 12 are service nodes, for example chassis management modules and computer rack management modules. Some dedicated computers of the server cluster are also included therein: for example a processing interface, or Login interface, a general administration server, a cluster descriptive data management server, an input/output management server and a backup server. Most of these dedicated computers are duplicated for backup reasons. The other nodes of the server cluster 12 are compute nodes for which the activity is generally managed by the general administration server.

The aforementioned various nodes of the server cluster 12 are interconnected together using a plurality of networks.

Optionally, one or a plurality of service networks (not shown) may specifically connect high-speed computing servers together to form one or a plurality of subnetworks wherein service data transfers are accelerated. They may adopt the form of bus, ring, meshed networks or based on other known topologies.

Moreover, an administration network (not shown) operating under the IP protocol, generally of the Ethernet type, is suitable for connecting the general administration server of the server cluster 12 to all the other nodes. Optionally, this general administration network may be mirrored with a primary control network dedicated for power-up, start-up, shut-down and the processing of some predetermined primary errors, or fatal errors, generating Core files, of the servers administered. Such a general administration network has for example a speed in the region of 100 Mbits/s.

Finally, one or a plurality of further networks, or compute data management networks, interconnect at least all the compute nodes, or all the compute and service nodes, of the server cluster 12. They have very high-speed features compared to the speed features of the administration network. Indeed, among other things, the computing data required for executing the processing instructions transmitted to the server cluster 12 transit via this/these compute data management network(s). They may adopt the form of tree or fat-tree type, ring, meshed networks or according to other known topologies. Such compute data management networks have for example a speed in the region of 40 Gbits/s per link.

At least one of the networks linking the nodes of the server cluster, whether it is the service network(s), the administration network, the compute data management network(s), or any other dedicated network, comprises a plurality of transmission segments each connecting point-to-point two elements of the server cluster, these segments being arranged according to a predetermined limited number of connection directions. For example, in a first direction, some of these transmission segments may connect two adjacent rows of computer racks together; in a second direction, some of these transmission segments may connect two adjacent computer racks from the same row together; in a third direction, some of these transmission segments may connect two adjacent chassis from the same computer rack together; and in a fourth direction, some of these transmission segments may connect two adjacent computers from the same chassis together.

This network is, hereinafter in the description, described as a geographic interconnection network and will be used advantageously for the transmission of service data. It uses for example the HDLC protocol. If it consists of a dedicated network different to the general administration network and the compute data management networks, it may for example have a speed in the region of 1 Mbits/s.

On a first level illustrated in FIG. 1 corresponding to the first direction, and as a non-limiting example, the geographic interconnection network comprises a plurality of transmission segments $10_{1/2}, \ldots, 10_{i-1/i}, 10_{i/i+1}, \ldots, 10_{I-1/I}$ for an interconnection of the rows $R1, \ldots, Ri, \ldots RI$ together in pairs: more specifically, the segment $10_{1/2}$ connects the rows R1 and R2 together via the first computer racks $B_{1,1}$ and $B_{2,1}, \ldots$ thereof, the segment $10_{i-1/i}$ connects the rows Ri−1 and Ri together via the first computer racks $B_{i-1,1}$ and $B_{i,1}$ thereof, the segment $10_{i/i+1}$ connects the rows Ri and Ri+1 together via the first computer racks $B_{i,1}$ and $B_{i+1,1}, \ldots$ thereof and the segment $10_{I-1/I}$ connects the rows RI−1 and RI together via the first computer racks $B_{I-1,1}$ and $B_{I,1}$ thereof. In this first connection direction, the transmission segments $10_{1/2}, \ldots, 10_{i-1/i}, 10_{i/i+1}, \ldots, 10_{I-1/I}$ comprise for example cables of approximately 10 meters each.

On a second level illustrated in FIG. 1 corresponding to the second direction, and as a non-limiting example, the geographic interconnection network further comprises a plurality of transmission segments $20_{1,1/2}, 20_{1,J1-1/J1}$ for an interconnection of the computer racks of the first row R1 together in pairs, ... a plurality of transmission segments $20_{i,1/2}, \ldots, 20_{i,Ji-1/Ji}$ for an interconnection of the computer racks of the i-th row Ri together in pairs, ... and a plurality of transmission segments $20_{I,1/2}, \ldots, 20_{I,JI-1/JI}$ for an interconnection of the computer racks of the last row RI together in pairs: more specifically, the segment $20_{1,1/2}$ connects the computer racks $B_{1,1}$ and $B_{1,2}$ together, ... the segment $20_{1,J1-1/J1}$ connects the computer racks $B_{1,J1-1}$ and $B_{1,J1}$ together, the segment $20_{i,1/2}$ connects the computer racks $B_{i,1}$ and $B_{i,2}$ together, ... the segment $20_{i,j-1/j}$ connects the computer racks $B_{i,j-1}$ and $B_{1,j}$ together, the segment $20_{i,j/j+1}$ connects the computer racks $B_{i,j}$ and $B_{1,j+1}$ together, ... the segment $20_{i,Ji-1/Ji}$ connects the computer racks $B_{i,Ji-1}$ and $B_{1,Ji}$ together, the segment $20_{I,1/2}$ connects the computer racks $B_{I,1}$ and $B_{I,2}$ together, ... and the segment $20_{I,JI-1/JI}$ connects the computer racks $B_{I,JI-1}$ and $B_{I,JI}$ together. In this second connection direction, the transmission segments $20_{1,1/2}, \ldots, 20_{1,J1-1/J1}, \ldots, 20_{i,1/2}, \ldots, 20_{i,Ji-1/Ji}, 20_{I,1/2}, \ldots, 20_{I,JI-1/JI}$ comprise for example cables of approximately 1 meter each.

The structure of the server cluster 12, as described above with reference to FIG. 1, is suitable for implementing the invention, but further possible cluster configurations, notably of the HPC computer type, comprising all or some of the aforementioned elements, or comprising further elements in the case of greater complexity and interconnected differently, are also suitable. Notably the server cluster 12 may comprise computer racks (for storage, temporarily not operational, etc.) which are not connected to the geographic interconnection network, although it may be sought to locate them geographically.

FIG. 2 illustrates in detail the general structure of any of the computer racks in FIG. 1, annotated $B_{i,j}$.

This computer rack $B_{i,j}$ comprises a computer rack management module $RMM_{i,j}$. It further comprises a plurality of stacked chassis $C_{i,j,1}, \ldots, C_{i,j,k}, \ldots C_{i,j,K}$. Each chassis comprises its own chassis management module $CMM_{i,j,1}, \ldots, CMM_{i,j,k}, \ldots CMM_{i,j,K}$ and a plurality of computers. To simplify the annotations, it is considered, in the example in FIG. 2, that all the chassis of the computer rack $B_{i,j}$ comprise the same number L of computers, but, in fact, this number may be completely different from one chassis to another and from one computer rack to another. In this way, as illustrated, the chassis $C_{i,j,1}$ comprises L computers $N_{i,j,1,1}, \ldots, N_{i,j,1,l}, \ldots N_{i,j,1,L}$, the chassis $C_{i,j,k}$ comprises L computers $N_{i,j,k,1}, \ldots, N_{i,j,k,l}, \ldots N_{i,j,k,L}$ and the chassis $C_{i,j,K}$ comprises L computers $N_{i,j,K,1}, \ldots, N_{i,j,K,l}, \ldots, N_{i,j,K,L}$.

The computer rack management module $RMM_{i,j}$ comprises a programmable logic circuit 21 for exchanging data between the computer rack $B_{i,j}$ and further computer racks of the server cluster 12 via the geographic interconnection network. As a general rule, this logic circuit 21 functionally comprises four bidirectional data exchange ports 22, 23, 24 and 25.

The first port 22 is designed to connect the management module $RMM_{i,j}$ of the computer rack $B_{i,j}$ to the management module of a further computer rack of the server cluster considered to be situated upstream from the computer rack $B_{i,j}$ in the direction of information distribution in the server cluster from a predetermined geographic source. According to the facility illustrated in FIG. 1 and choosing the computer rack $B_{1,1}$ at random as the geographic source, the computer rack situated upstream from the computer rack $B_{i,j}$ is $B_{i-1,1}$ if j=1 (i.e. when situated at the top of the row) and $B_{i,j-1}$ if j>1. Consequently, the first port 22 is designed to connect the management module $RMM_{i,j}$ of the computer rack $B_{i,j}$ to the management module $RMM_{i-1,1}$ of the computer rack $B_{i-1,1}$ if j=1 and to the management module $RMM_{i,j-1}$ of the computer rack $B_{i,j-1}$ if j>1.

The second port 23 is designed to connect the management module $RMM_{i,j}$ of the computer rack $B_{i,j}$ to the management module of a further computer rack of the server cluster considered to be downstream from the computer rack $B_{i,j}$ in the direction of information distribution in the server cluster from the geographic source and situated in the same row Ri. If such a computer rack exists, according to the direction of distribution chosen, the second port 23 connects the management module $RMM_{i,j}$ of the computer rack $B_{i,j}$ to the management module $RMM_{i,j-1}$ of the computer rack $B_{i,j+1}$.

The third port 24 is useful for the first computer racks $B_{i,1}$ of each row Ri, for any i<I. It is designed to connect the management module $RMM_{i,1}$ of the computer rack $B_{i,1}$ to the management module $RMM_{i+1,1}$ of the computer rack $B_{i+1,1}$, also considered to be downstream from the computer rack $B_{i,1}$ in the direction of distribution in the example in FIG. 1.

Finally, the fourth port 25 is suitable, on a third level of the geographic interconnection network, for connecting the management module $RMM_{i,j}$ of the computer rack $B_{i,j}$ to the chassis $C_{i,j,1}, \ldots, C_{i,j,k}, \ldots C_{i,j,K}$ of said computer rack.

On this third level illustrated in FIG. 2 corresponding to the third direction, and as a non-limiting example, the geographic interconnection network comprises a plurality of transmission segments $30_{0/1}, 30_{1/2}, \ldots, 30_{k-1/k}, 30_{k/k+1}, \ldots, 30_{K-1/K}$ for an interconnection of the chassis $C_{i,j,1}, \ldots C_{i,j,k}, \ldots C_{i,j,K}$ together in pairs and the connection thereof to the management module $RMM_{i,j}$: more specifically, the segment $30_{0/1}$ connects the management module $RMM_{i,j}$ of the computer rack $B_{i,j}$ to the management module $CMM_{i,j,1}$ of the chassis $C_{i,j,1}$, the segment $30_{1/2}$ connects the management module $CMM_{i,j,1}$ of the chassis $C_{i,j,1}$ to the management module $CMM_{i,j,2}$ of the chassis $C_{i,j,2}$, . . . the segment $30_{k-1/k}$ connects the management module $CMM_{i,j,k-1}$ of the chassis $C_{i,j,k-1}$ to the management module $CMM_{i,j,k}$ of the chassis $C_{i,j,k}$, the segment $30_{k/k+1}$ connects the management module $CMM_{i,j,k}$ of the chassis $C_{i,j,k}$ to the management module $CMM_{i,j,k+1}$ of the chassis $C_{i,j,k+1}$, . . . and the segment $30_{K-1/K}$ connects the management module $CMM_{i,j,K-1}$ of the chassis $C_{i,j,K-1}$ to the management module $CMM_{i,j,K}$ of the chassis $C_{i,j,K}$. In concrete terms, the management module $CMM_{i,j,k}$ of each chassis $C_{i,j,k}$ comprises a programmable logic circuit $31_k$ functionally comprising a first bidirectional data exchange port $32_k$ connected to the transmission segments $30_{k-i/k}$ and a second bidirectional data exchange port $33_k$ connected (except for $CMM_{i,j,K}$) to the transmission segment $30_{k/k+1}$. In this third connection direction, the transmission segments $30_{0/1}, 30_{1/2}, \ldots, 30_{k-1/k}, 30_{k/k+1}, \ldots, 30_{K-1/K}$ comprise for example cables of approximately 50 centimeters each.

On a fourth level illustrated in FIG. 2 corresponding to the fourth direction, and as a non-limiting example, the geographic interconnection network comprises a plurality of transmission segments $40_1, \ldots, 40_k, \ldots, 40_K$ for an interconnection of the computers of each chassis together and the connection thereof to the management module $CMM_{i,j,k}$ of the chassis in question: more specifically, the segment $40_1$ is for example an electronic backpanel multipoint bus connecting the management module $CMM_{i,j,1}$ of the chassis $C_{i,j,1}$ to all the computers $N_{i,j,1,1}, \ldots, N_{i,j,1,l}, \ldots, N_{i,j,1,L}, \ldots$ the segment $40_k$ is for example an electronic backpanel multipoint bus connecting the management module $CMM_{i,j,k}$ of the chassis $C_{i,j,k}$ to all the computers $N_{i,j,k,1}, \ldots, N_{i,j,k,l}, \ldots N_{i,j,k,L}, \ldots$ and the segment $40_K$ is for example an electronic backpanel multipoint bus connecting the management module $CMM_{i,j,K}$ of the chassis $C_{i,j,K}$ to all the computers $N_{i,j,K,1}, \ldots, N_{i,j,K,l}, \ldots N_{i,j,K,L}$. Alternatively, the multipoint buses $40_1, \ldots, 40_k, \ldots, 40_K$ could be replaced by a sequence of cables.

The structure of the computer rack $B_{i,j}$, as described above with reference to FIG. 2, is suitable for implementing the invention, but further possible computer rack configurations comprising all or some of the aforementioned elements, or comprising further elements in the case of greater complexity and interconnected differently, are also suitable.

It is noted that, according to the geographic structure proposed with reference to FIGS. 1 and 2 in four predetermined connection directions, each node $N_{i,j,k,l}$ of the server cluster 12 is suitable for easy spatial location using a system of coordinates (i, j, k, l) directly related to the organisation of the transmission segments along these directions, i, j and k indicating the number of first, second and third level segments (i.e. first, second and third directions) separating this node from a predetermined geographic source, l indicating the position, on the fourth level (i.e. fourth direction), of the node in the chassis $C_{i,j,k}$ thereof. This particularly applies in a voluntarily simplified view of the server cluster 12 where each computer rack is operational, equipped with computing means and where all the computer racks are interconnected together via the geographic interconnection network.

In this way, by identifying the path followed by data, during an exchange between a send node of the data and at least one receive node, using the system of coordinates (i, j, k, l) and supplying the data to the receive node with information relating to the path followed in this system of coordinates, it becomes easy to locate, at least relatively, the send node and/or receive node geographically and automatically.

In fact, a server cluster may further comprise computer racks not connected to the geographic interconnection network and thus in principle difficult to locate geographically, or even liable to disrupt the system of coordinates (i, j, k, l) directly associated with the organisation of the aforementioned transmission segments. It may for example consist of computer racks comprising no compute nodes or computer racks equipped with computing means but temporarily not operational since they are for example placed under long-term maintenance. However, in concrete terms, they have a clearly defined geographic location in the server cluster 12. To account for this type of situation, branches may be defined and predefined locally in the system of coordinates (i, j, k, l), for example on the indexes i and j. Merely by way of illustration: if a first level segment short-cuts such a computer rack not connected to the geographic interconnection network, it counts double for the coordinate i and if a second level segment short-cuts such a computer rack not connected to the geographic interconnection network, it counts double for the coordinate j. In this way, the system of coordinates (i, j, k, l), although directly associated with the transmission segments of the geographic interconnection network, remains consistent with the geographic reality of the server cluster 12.

A method for the exchange of data between nodes of the server cluster 12 including an identification of the path followed will now be described in the general principle thereof with reference to FIG. 3. For the implementation thereof and according to various possible embodiments, the programmable logic circuits $21, 31_1, \ldots, 31_k, \ldots, 31_K$ of each computer rack $B_{i,j}$ are equipped with means for incrementing or decrementing counters defined on the basis of the system of coordinates (i, j, k, l). These incrementation or decrementation means are for example implemented in software or hardware form to update coordinate values in this system of coordinates (i, j, k, l) according to the bidirectional data exchange port via which the data are input or output in the programmable logic circuit in question and according to an incrementing or decrementing rule which may be general or specific to each programmable logic circuit. More specifically, the incrementation or decrementation rule may be general and set to an increment or decrement of one unit in the simplified case of the server cluster 12 illustrated in FIGS. 1 and 2 where each computer rack is operational, equipped with computing means and where all the computer racks are interconnected together via the geographic interconnection network. To adapt to the actual situation of a server cluster wherein some computer racks are not connected to the geographic network, specific rules (increment or decrement by at least 2 units in one or more given directions, . . . ) may be envisaged in some programmable logic circuits adjacent to such unconnected computer racks.

According to a first step 100 of the method for the exchange of data in FIG. 3, a data frame comprising data intended for at least one further node, or receive node $N_r$, is generated by a send node $N_e$. This frame comprises, in addition to said data, four counters suitable for identifying the path to be followed by the frame to carry same to the receive node $N_r$. More specifically, a first counter Ci is intended to be updated, by incrementation or decrementation according to the target application and the chosen embodiment, according to the number of first level transmission segments traversed between the send node $N_e$ and the receive node $N_r$. A second counter Cj is intended to be updated, by incrementation or decrementation according to the target application and the chosen embodiment, according to the number of second level transmission segments traversed between the send node $N_e$ and the receive node $N_r$. A third counter Ck is intended to be updated, by incrementation or decrementation according to the target application and the chosen embodiment, according to the number of third level transmission segments traversed between the send node $N_e$ and the receive node $N_r$. Finally, a fourth counter Cl is intended to be updated, by incrementation or decrementation according to the target application and the chosen embodiment, according to the number of fourth level transmission segments traversed between the send node $N_e$ and the receive node $N_r$. Obviously, as mentioned above, the incrementation or decrementation rule applied to each passage of first, second, third or fourth level segments may be adapted locally according to the actual topology of the server cluster liable to include elements not connected to the geographic interconnection network.

During an initialisation step 102, the counters Ci, Cj, Ck and Cl are initialised to values Ci(e), Cj(e), Ck(e) and Cl(e) which are defined according to the target application and the chosen embodiment.

Subsequently, during a step 104, the data frame is sent by the send node $N_e$.

The next step 106 comprises the transmission of the data frame in the geographic interconnection network. During this step, according to the chosen embodiment and application, whenever a programmable logic circuit 21, $31_1$, ..., $31_k$, ..., $31_K$ receives or sends this frame, it increments or decrements the value of one of the counters Ci, Cj, Ck and Cl according to the port whereby it sends or receives and according to the incrementation or decrementation rule which may be general or which may be specific.

Subsequently, during a step 108, the data frame is received by the receive node $N_r$.

Finally, during a final step 110, the receive node extracts from the data frame the values of the counters on arrival, annotated Ci(r), Cj(r), Ck(r) and Cl(r).

In the method for the exchange of data detailed above, the coordinates of the sender and the receiver have been expressed generally in the complete system of coordinates (i, j, k, l). This means that it is initially assumed that any compute node of the server cluster 12 can send or receive. However, the sender or receiver may also be the programmable logic circuit of a computer rack or chassis management module, in which case the coordinates thereof may be expressed more simply in a restricted manner in the incomplete system of coordinates (i, j, k).

Various applications of the method for the exchange of data described above will now be detailed, according to various possible embodiments.

A first application consists of sending a specific request, from a first send node, for example an administration server, to a single second receive node, for example compute node. This request may notably be a MAC address request sent by a MAC address administer node, to establish the link between a given geographic address and the MAC address of the node situated at this geographic address. This transmission mode from a sender to a single receiver is generally referred to as unicast mode. One advantage of this transmission mode is that, on receiving the request, the receiver generally returns a response or acknowledgement message to the sender, unlike broadcast mode (broadcast of a request from a sender to all the other nodes in the network) which does not generally provide for returns.

According to this first application and according to one possible embodiment, assuming that the geographic address of the send node is $(i_e, j_e, k_e, l_e)$ and that the address of the receive node is $(i_f, j_f, k_f, l_f)$, the counters Ci, Cj, Ck and Cl may be initialised to the sending address, i.e. $Ci(e)=i_e$, $Cj(e)=j_e$, $Ck(e)=k_e$ and $Cl(e)=l_e$, and the programmable logic circuits 21, $31_1$, ..., $31_k$, ... $31_K$ of each computer rack $B_{i,j}$ may be equipped with means for incrementing and/or decrementing the counters according to the bidirectional data exchange port whereby the request is output in the programmable logic circuit in question.

More specifically, in the programmable circuit 21 of the management module $RMM_{i,j}$ of the computer rack $B_{i,j}$:

when the request is output via the second port 23: Cj is incremented by one unit, when the request is output via the third port 24 (for all the computer racks $B_{i,1}$): Ci is incremented by one unit, when the request is output via the fourth port 25 (for all the computer racks $B_{i,1}$): Ck is incremented by one unit, and when the request is output via the first port 22 (which represents the opposite direction of upstream to downstream distribution defined above): if j=1, Ci is decremented by one unit, if j>1, Cj is decremented by one unit.

Also more specifically, in the programmable circuit $31_k$ of the management module $CMM_{i,j,k}$ of the chassis $C_{i,j,k}$:

when the request is output via the second port $33_k$: Ck is incremented by one unit, and when the request is output via the first port $32_k$ (which represents the opposite direction of upstream to downstream distribution defined above): Ck is decremented by one unit.

It should be noted that the incrementation and/or decrementation rule chosen above is that of incrementing the counters by at least one unit (one unit by default and more than one unit locally when computer racks not connected to the geographic interconnection network are inserted in the server cluster 12) upstream to downstream in the distribution direction defined above. This choice is arbitrary and it is easy to make another, adapting the embodiment accordingly.

Also according to this embodiment, the request comprises a field wherein the geographic address $(i_f, j_f, k_f, l_f)$ of the receive node is indicated.

In this way, as illustrated in FIG. 4 and according to the aforementioned embodiment, a method for the exchange of data according to the invention for sending a request from a send node $N_{ie,je,ke,le}$ to a single receive node $N_{if,jf,kf,lf}$ of the server cluster 12 comprises the following steps.

During a first initialisation step 200, the counters Ci, Cj, Ck and Cl are initialised to $Ci(e)=i_e$, $Cj(e)=j_e$, $Ck(e)=k_e$ and $Cl(e)=l_e$.

During a step 202, a request is generated by the send node $N_{ie,je,ke,le}$ wherein the geographic address is $(i_e, j_e, k_e, l_e)$. This request comprises for example a header identifying it specifically as a request intended for a single receiver in unicast mode and also includes the counters Ci, Cj, Ck and Cl at the initial values thereof. As mentioned above, it further comprises a field containing the geographic address $(i_f, j_f, k_f, l_f)$ of the receive node.

The next step 204 starts, from the send node, the transmission of this request to the receive node via the geographic interconnection network. According to the aforementioned incrementation and/or decrementation rules for this first application and using the node $N_{ie,je,ke,le}$, the request is for example routed in the geographic interconnection network so as to always bring the values of the counters Ci, Cj, Ck and Cl close to the target geographic address $(i_f, j_f, k_f, l_f)$ indicated in the request.

When, during a step 206, the receive node $N_{if,jf,kf,lf}$ receives the request, it is recognised as the recipient of this request when all the counters Ci, Cj, Ck and Cl are at values equal to those of the target geographic address $(i_f, j_f, k_f, l_f)$ indicated in the request.

During a subsequent step 208, the receive node analyses the content of the request for which it is the recipient. Also during this step, according to the unicast mode, it prepares a message containing a response to this request: for example, a response including the MAC address thereof if the request relates to this. If the response is intended for the send node of the request, the counters Ci, Cj, Ck and Cl are initialised to $Ci(f)=i_f$, $Cj(f)=j_f$, $Ck(f)=k_f$ and $Cl(f)=l_f$ and the response is transmitted, with a field containing the new target geographic address $(i_e, j_e, k_e, l_e)$, to the send node via the geographic interconnection network according to the same incrementation and/or decrementation principle as for the request.

Finally, during a final step 210, the send node $N_{ie,je,ke,je}$ receives the response. It is recognised as the recipient of this response since all the counters Ci, Cj, Ck and Cl are at values equal to those of the target geographic address $(i_e, j_e, k_e, l_e)$ indicated in the response.

It should be noted that, according to this first application and according to a further possible embodiment, the counters Ci, Cj, Ck and Cl could be initialised to the difference between the destination address and the sending address, i.e. $Ci(e)=i_f-i_e$, $Cj(e)=j_f-j_e$, $Ck(e)=k_f-k_e$ and $Cl(e)=l_f-l_e$, and the programmable logic circuits $21, 31_1, \ldots, 31_k, \ldots, 31_K$ of each computer rack $B_{i,j}$ could be equipped with the following incrementation and/or decrementation means:

in the programmable circuit 21 of the management module $RMM_{i,j}$ of the computer rack $B_{i,j}$:
when the request is output via the second port 23: Cj is decremented by one unit,
when the request is output via the third port 24 (for all the computer racks $B_{i,1}$): Ci is decremented by one unit,
when the request is output via the fourth port 25 (for all the computer racks $B_{i,1}$): Ck is decremented by one unit, and
when the request is output via the first port 22: if j=1, Ci is incremented by one unit, if j>1, Cj is incremented by one unit.
in the programmable circuit $31_k$ of the management module $CMM_{i,j,k}$ of the rack $C_{i,j,k}$:
when the request is output via the second port $33_k$: Ck is decremented by one unit, and
when the request is output via the first port $32_k$: Ck is incremented by one unit.

It should also be noted that the MAC addresses of the nodes of the server cluster may all be collected from a collector node, for example a predetermined geographic source, according to a protocol based on the unicast transmission mode indicated in this first application. In this case, a specific program should scan all the nodes of the server cluster, for example according to the flow chart illustrated in FIG. 5, to transmit the same request successively to all the nodes. The combination of this scanning of all the nodes with successive transmissions in unicast mode will be described as "multi-unicast" mode transmission. This multi-unicast mode is thus presented as an alternative to broadcast mode, but having an additional advantage: that of enabling the geographic source to wait for a response to each request sent to any of the nodes of the set scanned.

According to a first step 300 resulting from an execution of this scanning program, the geographic address of the receive node of a request is for example initialised arbitrarily to i=1, j=1, k=1 and l=1, i.e. the address of the first computer (l=1) of the first chassis (k=1) of the first computer rack (j=1) of the first row R1 (i=1), referenced $N_{1,1,1,1}$. A geographic source is also chosen at random. In practical terms, such a geographic source is for example the programmable logic circuit of a computer rack or chassis management module in which case the coordinates thereof may be expressed more simply in a restricted manner in the incomplete system of coordinates (i, j, k). Preferably, it even consists of the programmable logic circuit of the management module $RMM_{1,1}$ of the first computer rack of the first row or the management module $CMM_{1,1,1}$ of the first chassis of the first computer rack of the first row, wherein the coordinates may be expressed in restricted fashion in the form (1,1, 1). The geographic source may then be referenced $N_{1,1,1}$.

During the following step 302, the set of steps 200 to 210 is executed by the geographic source $N_{1,1,1}$ on the basis of an initialisation of the counters to $Ci(e)=1$, $Cj(e)=1$, $Ck(e)=1$ and $Cl(e)=1$, for sending a request in unicast mode and waiting for a response. The request comprises a field indicating the target geographic address (i, j, k, l).

Subsequently, a test 304 is conducted on receipt of a response to the sent request. If the response includes a valid response (for example the MAC address) from the receive node having the address (i, j, k, l), this response is registered by the geographic source. The method then goes to a step 306 during which the index l is incremented by one unit and again to the step 302. If, on the other hand, the response is an error message (i.e. the geographic address is not accessible), the method goes to a new test step 308.

During the step 308, the value of the index l is tested. If the index is strictly greater than 1, the method then goes to a step 310 during which the index l is reset to 1 and the index k incremented by one unit, and the method returns to the step 302. If, on the other hand, the index l equals 1, the method goes to a new test step 312.

During the step 312, the value of the index k is tested. If the index is strictly greater than 1, the method then goes to a step 314 during which the index k is reset to 1 and the index j incremented by one unit, and the method returns to the step 302. If, on the other hand, the index k equals 1, the method goes to a new test step 316.

During the step 316, the value of the index j is tested. If the index is strictly greater than 1, the method then goes to a step 318 during which the index j is reset to 1 and the index i incremented by one unit, and the method returns to the step 302. If, on the other hand, the index j equals 1, the method goes to an end of scanning step 320.

All the nodes accessible via the geographic interconnection network from the geographic source are thus scanned. In this MAC address collection application, a list of the relationships between geographic addresses and MAC hardware addresses is thus prepared. Moreover, as the topology of the geographic interconnection network is known in advance since it corresponds to the physical installation of the server cluster 12, a further list of links between geographic addresses and IP logic addresses may be previously established. By cross-referencing these lists, it becomes possible to automatically associate each IP logical address with a MAC address. In this way, the server cluster generally including a DHCP IP address management server, this association of the MAC and IP addresses may be transmitted to the DHCP server.

Using these two lists, if the node chosen as the geographic source is configured correctly to be remotely accessible via the Ethernet administration network, the set of steps described above may be executed remotely. Furthermore, within the scope of more general control module administration via the Ethernet network, these control modules belonging to the server cluster 12 nodes, one of the modules prompted using the IP address thereof may be easily located geographically using this geographic address system.

One alternative embodiment of the first application is that of sending a remote command from a send node to a receive node, notably for emulating a control panel of this receive node, this node optionally being one of the nodes $N_{i,j,k,l}$, one of the chassis management modules $CMM_{i,j,k}$ or one of the computer rack management modules $RMM_{i,j}$ of the server cluster 12. For example, the programmable circuit $31_k$ of any of the chassis management modules $CMM_{i,j,k}$ is directly connected to the control panel of the chassis $C_{i,j,k}$ so as to adjust the control functions thereof which are generally only accessible via the Ethernet administration network or manually, with local operator intervention, using controls via a switch, wired button, serial communication port (generally referred to as "COM port") or other means. It may for example consist of restart, operation restore, initialisation (such as a reset to factory settings, an onboard software restart, or resetting of some parameters to default configuration values, etc.), maintenance or other functions. On receipt via the geographic interconnection network and according to the aforementioned method of such a command by the programmable circuit $31_k$, the circuit transfers the command to the suitable receivers of the control panel of the chassis $C_{i,j,k}$ in order to execute the restart, operation restore, initialisation, maintenance or other function identified in the command.

In particular, in order to emulate the COM port, once a connection thereto is open, the remote command is sent regularly in unicast mode. This command contains input data to the module in question. If there is no data to be transmitted, an empty frame may be sent. In response to the command, output data from the module in question may in turn be returned.

Similarly, a further alternative embodiment of the first application is that of sending a remote control signal from a send node to a receive node, notably for emulating a control panel of this send node, this node optionally being one of the nodes $N_{i,j,k,l}$, one of the chassis management modules $CMM_{i,j,k}$ or one of the computer rack management modules $RMM_{i,j}$ of the server cluster 12. For example, the programmable circuit $31_k$ of any of the chassis management modules $CMM_{i,j,k}$ is directly connected to the control panel of the chassis $C_{i,j,k}$ so as to adjust the control functions thereof which are generally only accessible via the Ethernet administration network or locally using diodes or other means, with local operator intervention. It may for example consist of reporting, alarm or other functions. On detection by the control panel of the chassis $C_{i,j,k}$ of any event justifying the sending of a control signal, this is transmitted to the programmable circuit $31_k$, which transfers the information to the receive node (for example an administration server) via the geographic interconnection network according to the method described above.

It should be noted that, as a general rule, the first application, and the alternative embodiments thereof detailed above, relate to the unicast mode transmission of messages from a sender to a single receiver or optionally multi-unicast mode transmission. This is notably the reason for which it is chosen to initialise the counters to the sending address, insert the receiving address in a field provided for this purpose in the message sent and perform incrementations/decrementations as indicated in this first application.

A second application consists of automatically allocating, to each node of the server cluster 12, a geographic address directly correlated with the spatial configuration of the geographic interconnection network via the transmission to all these nodes of a geographic address allocation request using a node chosen as the geographic source, for example the node $N_{1,1,1}$.

According to this second application and according to one possible embodiment, the geographic address allocation request is transmitted in multi-unicast mode, according to the example given above for MAC address collection. The steps 300 to 320 are thus executed, including an execution of the steps 200 to 210 on each loop of the step 302, on the basis of an initialisation of the counters Ci, Cj and Ck at the source address of the node chosen as the sending geographic source of the request, and the counter Cl, if used, at 1 for example. The programmable logic circuits 21, $31_1$, . . . , $31_k$, . . . , $31_K$ of each computer rack are further equipped with means for incrementing and/or decrementing the counters according to the bidirectional data exchange port via which the request is sent in the programmable logic circuit in question. The incrementation and/or decrementation rules are the same as those described for the first application.

This second application differs from the MAC address collection essentially in that, during the step 202, the request generated by the geographic source $N_{1,1,1}$ comprises a header specifically identifying it as a geographic address allocation request.

Finally, also according to this second application, the transmitted request comprises a field wherein the geographic address of the receive node is indicated, this address varying on each loop of the collection method implementing the steps 300 to 320.

When, during any loop of the step 206, any one of the corresponding nodes $N_{i,j,k,l}$ receives the geographic address allocation request and is recognised as the recipient (i.e. the counters are at values equal to those of the target geographic address indicated in the request), it extracts the values of counters Ci, Cj, Ck and Cl or the target geographic address (which amounts to the same thing) of this request. More specifically, for the node $N_{i,j,k,l}$, Ci=i, Cj=j, Ck=k and Cl=l. The geographic address (i, j, k, l) is then allocated to the node $N_{i,j,k,l}$ which saves same for example in a local memory. Moreover, according to the steps 208 and 210 described above, it returns an acknowledgement of receipt or a validation response to the geographic source. A geographic address is thus allocated to each accessible node of the server cluster 12.

A third application, assuming that the second application has been executed for the allocation of a geographic address to each node, consists of checking the integrity of the geographic interconnection network and the geographic addresses allocated by means of the transmission of a verification request from an administer node chosen to perform this check. This administer node may be the node $N_{1,1,1}$ chosen as the geographic source of the second application.

According to this third application and according to a third possible embodiment, the verification request is transmitted in multi-unicast mode, according to the examples given above for MAC address collection and for the geographic address allocation. The steps 300 to 320 are thus executed, including an execution of the steps 200 to 210 on each loop of the step 302, on the basis of an initialisation of the counters Ci, Cj and Ck to the source address of the node chosen as the sending geographic source of the verification request and the counter Cl, if used, at 1 for example. The programmable logic circuits 21, $31_1, \ldots, 31_k, \ldots, 31_K$ of each computer rack $B_{i,j}$ are further equipped with means for incrementing and/or decrementing the counters according to the bidirectional data exchange port via which the request is sent in the programmable logic circuit in question. The incrementation and/or decrementation rules are the same as those described for the first and second applications.

This third application differs from the second essentially in that, during the step 202, the request generated by the geographic source $N_{1,1,1}$ comprises a header specifically identifying it as a verification request.

Finally, also according to this third application, the transmitted request comprises a field wherein the geographic address of the receive node is indicated, this address varying on each loop of the collection method implementing the steps 300 to 320.

When, during any loop of the step 206, any one of the corresponding nodes $N_{i,j,k,l}$ receives the verification request and is recognised as the recipient (i.e. the counters are at values equal to those of the target geographic address indicated in the request), it extracts the values of counters Ci, Cj, Ck and Cl or the target geographic address (which amounts to the same thing) of this request. It then compares these values to the locally registered geographic address (i, j, k, l) thereof.

Moreover, according to the steps 208 and 210 described above, if the values correspond, it returns a validation message including the geographic address thereof to the geographic source, otherwise it may return an error message. Optionally, the validation message may include the MAC of this node such as a relationship may be established between the MAC address and the geographic address.

In particular, during successive loops of the steps 210, the geographic source collects the messages returned by the geographic interconnection network after sending the verification request thereof. According to the responses received, it becomes very simple to determine whether branches (i.e. transmission segments) of the geographic interconnection network are malfunctioning or if there are inconsistencies in the geographic address registration: in particular, a geographic interconnection network malfunction is conveyed by a lack of response from the node downstream from which a transmission segment is malfunctioning and from all the nodes situated downstream from this node; an inconsistency is detected by the receipt of a message indicating the malfunction from the node situated upstream from the transmission segment in question. If the validation messages collected include the MAC addresses of the sending nodes thereof, it further becomes possible to automatically associate each geographic address of each node of the server cluster 12 with a MAC address and save this association.

It should be noted that, as a general rule, the second and third applications detailed above, as for the specific collection of MAC addresses, relate to the distribution of a request from a geographic source to all the other nodes of the server cluster 12. This is notably the reason why transmission of the request in multi-unicast mode is chosen. Alternatively, it may be chosen to transmit this request in broadcast mode, but this alternative is less advantageous in principle since it does not envisage as a general rule returning a response on receipt of a request. However, such a broadcast message transmission mode may be envisaged in some cases, notably after allocating the geographic addresses and verifying the integrity of the geographic interconnection network.

A fourth application, described as a broadcast application, thus consists generally of distributing a message in broadcast mode to all the nodes of the server cluster from a geographic source, for example the node $N_{1,1,1}$. According to this fourth broadcast application and according to one possible embodiment, the counters Ci, Cj and Ck are initialised to the address (1,1,1) of the node chosen as the geographic source sending the message, the counter Cl, if used, is for example initialised to 1 and the programmable logic circuits 21, $31_1, \ldots, 31_k, \ldots, 31_K$ of each computer rack $B_{i,j}$ are equipped with means for incrementing and/or decrementing the counters according to the bidirectional data exchange port via which the request is sent in the programmable logic circuit in question.

More specifically, in the programmable circuit 21 of the management module $RMM_{i,j}$ of the computer rack $B_{i,j}$:
when the request is output via the second port 23: Cj is incremented by one unit,
when the request is output via the third port 24 (for all the computer racks $B_{i,1}$): Ci is incremented by one unit,
when the request is output via the fourth port 25 (for all the computer racks $B_{i,1}$): Ck is incremented by one unit, and
when the request is output via the first port 22 (which represents the opposite direction of upstream to downstream distribution defined above): if j=1, Ci is decremented by one unit, if j>1, Cj is decremented by one unit.

Also more specifically, in the programmable circuit $31_k$ of the management module $CMM_{i,j,k}$ of the chassis $C_{i,j,k}$:
when the request is output via the second port $33_k$: Ck is incremented by one unit, and
when the request is output via the first port $32_k$ (which represents the opposite direction of upstream to downstream distribution defined above): Ck is decremented by one unit.

It should be noted that the incrementation and/or decrementation rule chosen above is that of incrementing the counters by at least one unit (one unit by defaults and more than one unit locally when computer racks not connected to the geographic interconnection network are inserted in the server cluster 12) upstream to downstream in the broadcast direction defined above. This choice is arbitrary and it is easy to make another, adapting the embodiment accordingly.

In this way, as illustrated in FIG. 6 and according to the aforementioned embodiment, a method for broadcasting a message from a geographic source may comprise the following steps.

During a first initialisation step 400, a geographic source is selected from the nodes of the server cluster 12. This geographic source is for example the node $N_{1,1,1}$.

Subsequently, during a second initialisation step 402, the counters Ci, Cj, Ck and Cl are initialised to Ci(e)=Cj(e)=Ck(e)=Cl(e)=1.

During a step 404, a message for broadcast is generated by the geographic source $N_{1,1,1}$. This message includes the counters Ci, Cj, Ck and Cl at the initial values thereof.

The next step 406 starts, from the geographic source $N_{1,1,1}$, the broadcasting of this message throughout the server cluster 12 via the geographic interconnection network. According to the aforementioned incrementation and/or decrementation rules and from the node $N_{1,1,1}$ chosen as the source, whenever the request is routed to a first level transmission segment in the upstream to downstream distribution direction, the counter Ci thereof is incremented by one unit (or more if a computer rack not connected to the geographic interconnection network is inserted in the first direction), whenever the request is routed to a second level transmission segment in the upstream to downstream distribution direction, the counter Cj thereof is incremented by one unit (or more if a computer rack not connected to the geographic interconnection network is inserted in the second direction), whenever the request is routed to a third level transmission segment in the upstream to downstream distribution direction, the counter Ck is incremented by one unit and the counter Cl is incremented according to the status of the request in the chassis in question.

During a step 408, any one of the nodes $N_{i,j,k,l}$ receives the message. This receiving step may be followed by an action 410 defined according to the nature of the distributed message.

Moreover, given that in the embodiments envisaged above the incrementation/decrementation rules are the same in unicast, multi-unicast and broadcast modes, the messages sent using these three modes may have the same format, the distinction between unicast or multi-unicast mode and broadcast mode being suitable for being based merely on the target geographic address inserted in the messages: the latter may indeed adopt a predetermined value recognised as inaccessible to identify broadcast mode (for example, it may be required that the maximum values for i, j, k and l are reserved for broadcast mode): in this way, in the receiving step 408, the message is recognised by any of the receive nodes as having been sent in broadcast mode by means of the specific value adopted by the target geographic address.

It is clearly appears that a method for the exchange of data such as that described above according to various embodiments and possible applications multiply data exchange capabilities, notably in respect of administration, geographic location, monitoring and control data, via the geographic interconnection network. By supplying data with information relating to the transmission segments of the geographic interconnection network traversed, the latter becomes particularly suitable for carrying out maintenance of the Ethernet administration network in the event of failure thereof. Conversely, the Ethernet administration network is also suitable for carrying out maintenance of the geographic interconnection network in the event of failure thereof. This may be referred to as cooperative maintenance between these two networks: in other words, two transmission networks of different types are available for service data transmission, one suitable for acting as a backup for the other in the event of a problem. The likelihood of both networks being faulty at the same time is actually lower as they are of different types.

Moreover, it should be noted that the invention is not limited to the embodiments and applications described above. Indeed, it would be obvious to those skilled in the art that various modifications may be made to the embodiments described above, in the light of the teaching disclosed herein. In particular, in the claims hereinafter, the terms used should not be interpreted as limiting the claims to the embodiments described in the present description, but should be interpreted as including all the equivalents intended to be covered by the claims due to the wording thereof and which are suitable for being envisaged by those skilled in the art by applying their general knowledge to the implementation of the teaching disclosed herein.

The invention claimed is:

1. A method for the exchange of data between nodes of a server cluster comprising a plurality of nodes interconnected together by a geographic interconnection network comprising a plurality of transmission segments linking the plurality of nodes together, the method comprising;

sending by a sending node data intended for at least one other receiving node;

transmitting said data using the geographic interconnection network; and receiving said data by each said receiving node, wherein the data is supplied to each said receiving node with information relating to all of the transmission segments of the geographic interconnection network traversed between the sending node and said receiving node on transmission thereof, said information comprising at least one counter incremented or decremented when a corresponding transmission segment of said transmission segments of the geographic interconnection network is traversed by the data on transmission thereof from said sending node to said receiving node, wherein each said node is included in a chassis which is in turn included in a computer rack which is in turn included in a row of computer racks, the server cluster comprising a plurality of said rows of computer racks, wherein the geographic interconnection network comprises a plurality of segments for interconnecting the rows together, segments for interconnecting computer racks from the same row together, segments for interconnecting chassis from the same computer rack together, and segments for interconnecting nodes from the same chassis together, wherein the method further comprises exchanging data between the sending node and each said receiving node to transmit, with this data, at least one item of information relating to a number of row interconnection segments traversed between the sending node and said receiving node a number of computer rack interconnection segments traversed between the sending node and said receiving node, and a number of chassis interconnection segments traversed between the sending node and said receiving node, wherein the information relating to the transmission segments traversed between the sending node and each said receiving node comprises at least one field for indicating the number of row interconnection segments traversed between the sending node and said receiving node, a field for indicating the number of computer rack interconnection segments traversed between the sending node and said receiving node, and a field for indicating the number of chassis interconnection segments traversed between the sending node and said receiving node, and wherein the method further comprises incrementing or decrementing each of said fields once a message including data exchanged between the sending node and said receiving node passes through a corresponding segment.

2. The method for the exchange of data according to claim 1,
wherein the plurality of transmission segments is organised according to a predetermined limited number of different connection directions, and
wherein the information relating to the transmission segments traversed is defined by a system of coordinates which uses said predetermined limited number of different connection directions such that each coordinate of the system of coordinates is associated with a single one of the different connection directions.

3. The method for the exchange of data according to claim 2, wherein the information relating to the transmission segments traversed comprises one counter in each said connection direction which is incremented or decremented once a transmission segment linking two nodes in the corresponding direction is traversed by the data on the transmission thereof.

4. The method for the exchange of data according to claim 3, wherein an increment or decrement value is associated with each said transmission segment and is defined according to the presence or absence of at least one additional node of the server cluster which is not connected to the geographic interconnection network but which is arranged geographically between the two nodes interconnected by said transmission segment.

5. The method for the exchange of data according to claim 3, further compromising;
allocating a geographic address to each node, said allocating comprising
selecting a geographic source chosen from the plurality of nodes of the server cluster;
allocating a source address to this geographic source and initializing the counter to at least one value defined on the basis of the source address allocated;
transmitting via the geographic source to all other nodes of the server cluster, or receiving nodes, a message identified as requiring the allocation of a geographic address and including the counter, said transmitting requiring incrementing or decrementing the counter once the message passes through a corresponding transmission segment;
allocating to each receiving node of a geographic address in the server cluster defined on the basis of the value adopted by the counter when the message is received by receiving node; and
saving the geographic address of each node in address storage means of the server cluster.

6. The method for the exchange of data according to claim 5, wherein the geographic address allocated to any of the plurality of nodes of the server cluster is saved locally by said node using the storage means.

7. The method for the exchange of data according to claim 5, further comprising:
verifying the integrity of the geographic interconnection network and the geographic addresses allocated, said verifying comprising
initializing the counter to at least one value defined on the basis of the geographic address of an administer node responsible for verifying said integrity;
transmitting via said administer node to all other nodes of the server cluster, or receiving nodes, a message identified as requiring a verification of said integrity and including the counter, said transmitting requiring incrementing or decrementing the counter once the message passes through a corresponding transmission segment;
returning to the administer node via at least a portion of the receive nodes validation or error messages in response to the request message; and
detecting a possible malfunction of the geographic interconnection network or a possible inconsistency in the allocation of the geographic addresses on the basis of the messages returned to the administer node.

8. The method for the exchange of data according to claim 5, wherein upon sending by the sending node data intended for the receiving node, the counter is initialised to at least one value defined on the basis of the geographic address of the sending node:
wherein upon the transmission of said data using the geographic interconnection network, incrementing or decrementing the counter once a corresponding transmission segment is traversed by a message comprising this data, and further transmitting the data with at least one value corresponding to the geographic address of the receiving node, and
wherein the data is considered to have reached the receiving node when the counter value is equal to the geographic address value of the receiving node transmitted with the data.

9. The method for the exchange of data according to claim 8, wherein the data transmitted by the sending node to the receiving node comprises one of the elements of the set consisting of:
a request to allocate a geographic address to the receiving node, the sending node of said request being a geographic source chosen from the plurality of nodes of the server cluster;
a request to verify the geographic address of the receiving node, the sending node of said request being a geographic source chosen from the plurality of nodes of the server cluster;
a Medium Access Control (MAC) address request, the sending node of said MAC address request being an administer node of MAC addresses of all nodes of the server cluster;
a response to a MAC address request;
a command to emulate a control panel command function of the receiving node including one of a restart, operation restore, initialization and a maintenance function; and
a command to emulate a control panel command function of the receiving node including a reporting or alarm function.

10. A server cluster comprising:
a plurality of nodes interconnected together by a geographic interconnection network comprising a plurality of transmission segments linking the plurality of nodes together,
means for transmitting, using the geographic interconnection network, data sent by a sending node, and intended for at least one other node receiving node,
means for generating information relating to all of the transmission segments of the geographic interconnection network traversed between the sending node and said at least one receiving node on the transmission thereof, said information comprising at least one counter incremented or decremented when a corresponding transmission segment of said transmission segments of the geographic interconnection network is traversed by the data on the transmission thereof from said sending node to said receiving node; and
means for supplying, to the at least one receiving node said information with the transmitted data, wherein each said node is included in a chassis which is in turn included in a computer rack which is in turn included in a row of computer racks, the server cluster comprising a plurality of said rows of computer racks, wherein the geographic interconnection network comprises a plurality of segments for interconnecting the rows together, segments for interconnecting computer racks from the same row together, segments for interconnecting chassis from the same computer rack together, and segments for interconnecting nodes from the same chassis together, and wherein the server cluster comprises means for exchanging data between the sending node and each said receiving node designed to transmit, with this data, at least one item of information relating to a number of row interconnection segments traversed between the sending node and said receiving node a number of computer rack interconnection segments traversed between the sending node and said receiving node, and a number of chassis interconnection segments traversed between the sending node and said receiving node, wherein the information relating to the transmission segments traversed between the sending node and each said receiving node comprises at least one field for indicating the number of row interconnection segments traversed between the sending node and said receiving node, a field for indicating the number of computer rack interconnection segments traversed between the sending node and said receiving node, and a field for indicating the number of chassis interconnection segments traversed between the sending node and said receiving node, incrementing or decrementing means are provided for incrementing or decrementing each of said fields once a message including data exchanged between the sending node and said receiving node passes through a corresponding segment.

11. The server cluster according to claim 10, wherein the plurality of nodes are further interconnected together by an administration network configured for service data transmission according to an Internet Protocol (IP) protocol and each comprising a predefined Medium Access Control (MAC) address network interface, wherein addressing means is provided for allocating a geographic address to each said node of the server cluster on the basis of the information relating to the transmission segments of the geographic interconnection network traversed between a node chosen as the geographic source and each said node, and wherein saving means is provided for saving and storing the geographic address allocated to each node in association with the MAC address thereof.

12. The server cluster according to claim 10, further comprising: a first general administration network interconnecting all the plurality of nodes together; and at least one second management network of compute data to be exchanged between the plurality of nodes, interconnecting at least a portion of the plurality of nodes together, wherein said geographic interconnection network is an additional network, separate from the general administration network and the compute data management network.

13. The server cluster according to claim 12, wherein the geographic interconnection network is a network using the HDLC protocol.

* * * * *